(12) United States Patent
Goetz

(10) Patent No.: US 6,192,304 B1
(45) Date of Patent: Feb. 20, 2001

(54) CONTROL DEVICE FOR INFLUENCING THE DRIVING DYNAMICS OF FOUR-WHEEL VEHICLES

(75) Inventor: Jochen Goetz, Jettingen (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/280,661

(22) Filed: Mar. 29, 1999

(30) Foreign Application Priority Data

Mar. 28, 1998 (DE) .............................. 198 13 945

(51) Int. Cl.⁷ .................................. G05D 1/00; B62D 1/00
(52) U.S. Cl. ............................ 701/41; 280/92; 180/400
(58) Field of Search .................. 701/41; 280/91.1, 280/92, 5.51, 211; 73/1.75, 1.37; 180/400, 410, 419, 6.2; 340/465; 318/489

(56) References Cited

U.S. PATENT DOCUMENTS

| | | | |
|---|---|---|---|
| 4,967,865 | * 11/1990 | Schindler | 180/408 |
| 5,020,619 | * 6/1991 | Kanazawa et al. | 180/412 |
| 5,208,751 | * 5/1993 | Berkefeld | 701/41 |
| 5,341,294 | * 8/1994 | Kanazawa et al. | 701/41 |
| 5,343,393 | * 8/1994 | Hirano et al. | 701/41 |
| 5,379,222 | * 1/1995 | Anan et al. | |
| 5,907,277 | * 5/1999 | Tokunaga | 340/441 |
| 5,925,083 | * 7/1999 | Ackermann | 701/41 |
| 5,954,774 | * 9/1999 | Jung et al. | 701/41 |

* cited by examiner

*Primary Examiner*—William A. Cuchlinski, Jr.
*Assistant Examiner*—Olga Hernandez
(74) *Attorney, Agent, or Firm*—Evenson, McKeown, Edwards & Lenahan, P.L.L.C.

(57) ABSTRACT

In a control device for influencing the driving dynamics of four-wheel vehicles, the vehicle lengthwise speed and the steering angle are introduced as input signals and control signals are generated that act on positioning devices for adjusting the vehicle wheels. In order to set and adjust the transverse dynamic properties of a vehicle with a low cost of construction in normal driving, for setting a desired driving behavior, target values may be specified for the steering ratio, the self-steering gradient, and the float angle gradient as set signals from which steady-state additional trail angles can be determined which can be supplied as control signals to the positioning devices.

14 Claims, 2 Drawing Sheets

CONTROL DEVICE FOR INFLUENCING THE DRIVING DYNAMICS OF FOUR-WHEEL VEHICLES

BACKGROUND AND SUMMARY OF THE INVENTION

This application claims the priority of German patent document 198 13 945.4, filed Mar. 28, 1998, the disclosure of which is expressly incorporated by reference herein.

The invention relates to a control device for influencing the driving dynamics of a four-wheel vehicle.

A device for controlling four-wheel steering of a motor vehicle disclosed in German patent document DE 41 39 009 C1 includes positioning devices for the front wheels and the rear wheels, and generates control signals that actuate the positioning devices in accordance with specified steering laws. The specified steering laws are intended to permit control of the yaw and transverse acceleration behavior of the vehicle, in order to achieve an optimum response behavior relative to slip angle development when steering.

This control device has the disadvantage that the steering engagement with the rear wheels requires a high cost of construction, whose advantages are usually realized only in driving dynamic marginal situations. Deliberately influencing the driving behavior below the marginal range, especially a separate control of yaw and transverse acceleration behavior, is not possible however.

The object of the invention is to set and tune the transverse dynamic properties of a vehicle in the normal driving range at a low cost of construction.

This and other objects and advantages are achieved by the control device according to the invention, which makes it possible to produce changes in the trail angle at the front wheels and rear wheels to produce a specific desired dynamic driving behavior. The driving behavior relative to the transverse dynamics of the vehicle can be specified in accordance with objective criteria for vehicle evaluation and the trail angle at the front and rear wheels can be adjusted on the basis of these criteria.

The specified target values which are used as criteria of vehicle evaluation are the steering ratio, the self-steering gradient, and the float angle gradient, which are supplied as set signals to the control device. From these target values, the control device, on the basis of the current vehicle speed and steering angle, as well as other vehicle-specific parameters, generates control signals by which the positioning devices at the front and rear wheels are actuated. The control signals, which represent additional trail angles for influencing the dynamic driving behavior, are determined relative to the trail angles of the basic tuning and are added to the latter. The vehicle speed and the steering angle can be detected by sensors.

The steering ratio, the self-steering gradient, and the float angle gradient as setpoints to be specified are selected specifically for the vehicle and in accordance with desired driving behavior. On the basis of experiential values, for example for setting a "sporty" driving behavior of the vehicle, a small float angle gradient can be specified, by which the yaw movements of the vehicle are minimized.

The trail angles to be determined are available as steady-state control signals by which the trail angle can be adjusted for the front wheels and the rear wheels during driving as a function of the steering angle and the vehicle speed. The adjustment of the steady-state trail angle alone influences the dynamic driving behavior with respect to the yaw rate and the transverse acceleration of the vehicle.

In addition to the steady-state adjustment, according to an advantageous improvement, the trail angle can be dynamically tuned during driving with control signals variable as a function of time. In dynamic tuning, the steady-state additional trail angle is rendered dynamic, so that the additional trail angle follows a time-dependent transient characteristic. Preferably, a relationship is created between the time-variable curve of the additional trail angle and the time-variable curve of the front and rear additional float angle and of an additional self-steering angle that has been rendered dynamic. The dynamics are expressed with the aid of a Laplace transform, with the dynamic terms being dropped in a steady-state curve and the relationships being identical for the steady-state and dynamic additional trail angles.

The curve of the frequency response of the transverse acceleration can be influenced by a transverse acceleration amplification factor that can be specified in advance, especially in the range between 0 and approximately 2 Hz. If the amplification factor is chosen to be larger than zero, a driving-dynamic critical drop in the transverse acceleration amplification in this frequency range can be avoided. If the amplification factor is chosen to be less than zero, the transverse acceleration amplification can be reduced.

In addition, by a suitable choice of the factors that influence the dynamics, the yaw rate frequency response can remain unchanged, and thus retain the same curve as in basic tuning, without applying a steady-state or dynamic additional trail angle. Changes in the frequency response of the yaw rate, caused by a time-variable curve of the additional float angle, can be compensated.

The yaw frequency response in a preferred embodiment can be influenced directly by specifying the yaw natural frequency and yaw damping.

Dynamic tuning of the additional trail angle is possible independently of the steady-state setting. In a first expansion stage, adjustments can be made initially only in the steady state, while tuning can then be performed dynamically in the second expansion stage.

Other objects, advantages and novel features of the present invention will become apparent from the following detailed description of the invention when considered in conjunction with the accompanying drawings.

DETAILED DESCRIPTION OF THE DRAWINGS

Figure 1:
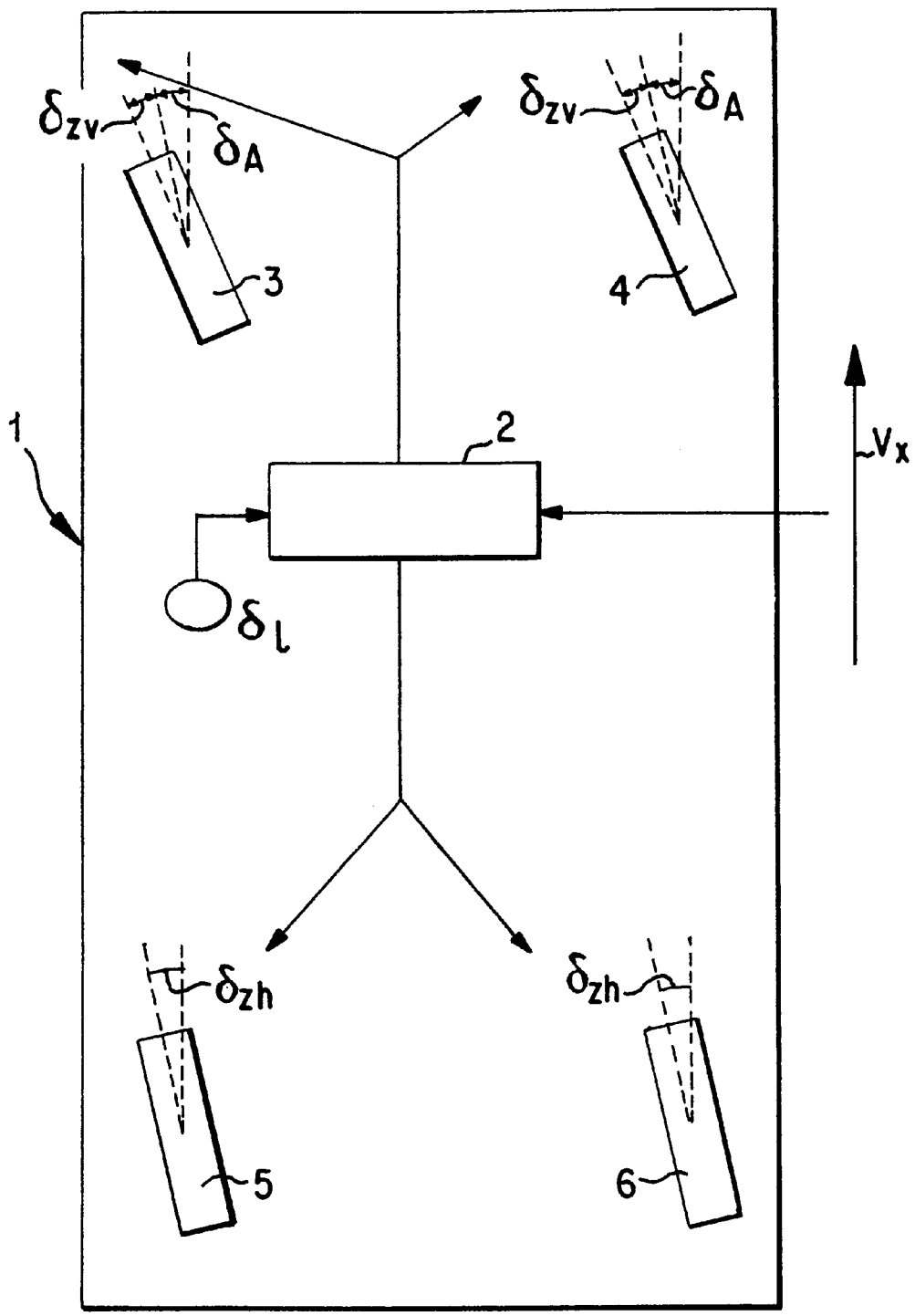
FIG. 1 is a schematic view of a vehicle with a control device.

The four-wheel vehicle 1 shown in FIG. 1 and steerable by front wheels 3, 4 has a steering device for specifying a steering angle $\delta_1$ which according to a given steering ratio $i l_B$ is converted into a trail angle $\delta_A$ at front wheels 3, 4 of vehicle 1. To influence the driving dynamics of the vehicle, especially the transverse dynamics, a control device 2 is provided which, as a function of the steering angle $\delta_1$ and the vehicle lengthwise speed $v_x$, generates control signals for positioning devices which set additional trail angles $\delta_{zv}$ and $\delta_{zh}$ that correspond to the control signals at the front wheels 3, 4 and the rear wheels 5, 6. The transverse dynamics of the vehicle 1 can be set by means of the additional trail angles $\delta_{zv}$, $\delta_{zh}$ in accordance with objective vehicle evaluation criteria.

Figure 2:
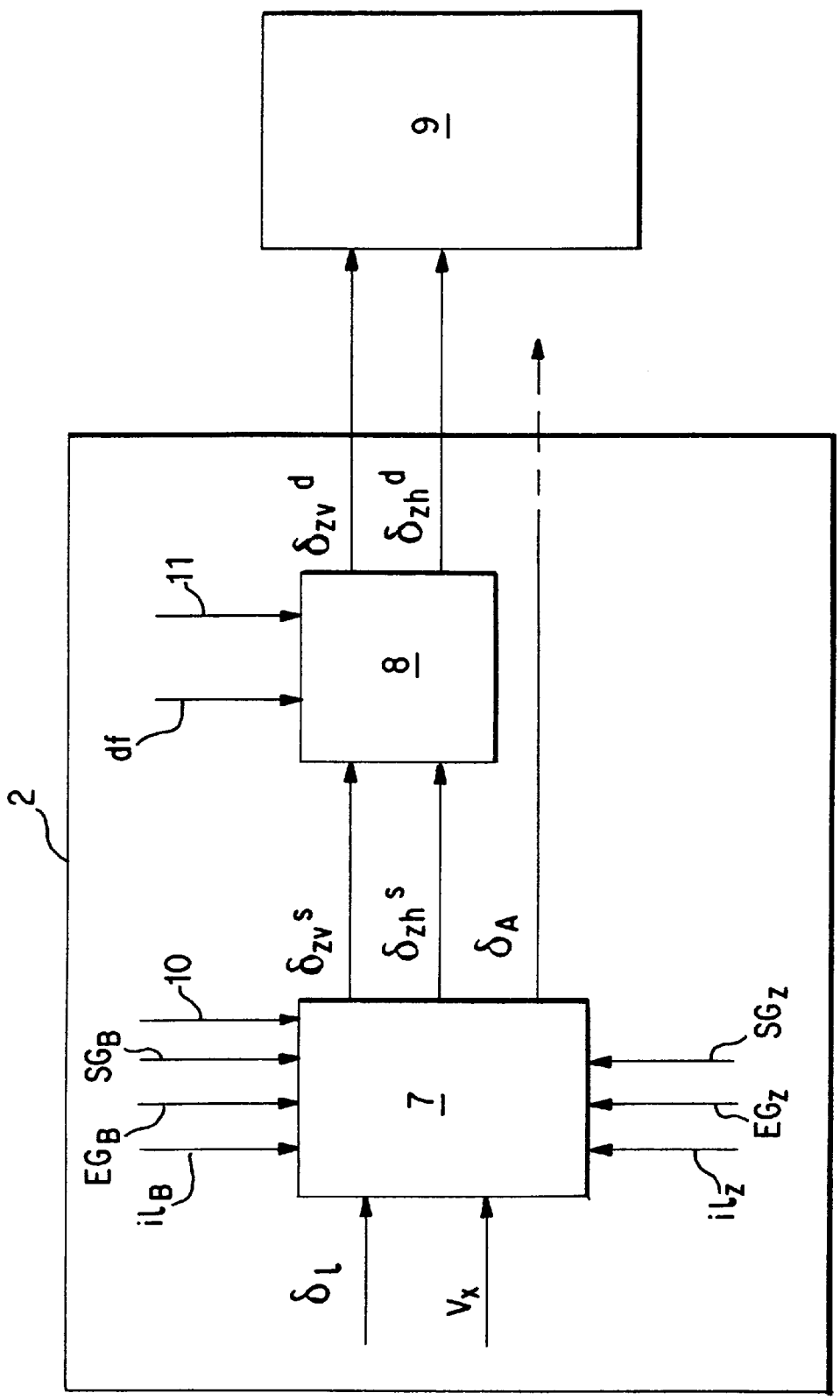
FIG. 2 shows the structure of the positioning device, with the control device connected downstream.

FIG. 2 shows the control device 2 with positioning device 9 connected downstream for adjusting the additional trail angles $\delta_{zv}$, $\delta_{zh}$ at the vehicle wheels. The positioning device 9, shown only schematically, acts on both the front wheels and the rear wheels of the vehicle. The control device 2 consists of a first processing unit 7 for producing control signals that correspond to the steady-state additional trail angles $\delta_{zv}^{s}$, $\delta_{zh}^{s}$ and an optionally installed second processing unit 8 for producing control signals that correspond to dynamic additional trail angles $\delta_{zv}^{d}$, $\delta_{zh}^{d}$, said control signals being supplied to positioning device 9. The trail angle $\delta_A$ can also be determined in control device 2 from the steering angle $\delta_1$ and the steering ratio and can be supplied as a control signal to control device 9.

The first processing unit 7 of control device 2 for generating steady-state additional trail angles $\delta_{zv}^{s}$, $\delta_{zh}^{s}$ processes the steering angle $\delta_1$ and the lengthwise speed $v_x$ as input signals. In addition, basic values $il_B$, $EG_B$, and $SG_B$ for the steering ratio, the self-steering gradient, and float angle gradient are applied to the first processing unit 7. These basic values determined as a result of the basic tuning of the vehicle designwise, and influence the transverse dynamics of the vehicle to a significant degree. In order to impose a modified driving behavior relative to the transverse dynamics of the vehicle, the target values $il_Z$, $EG_Z$, and $SG_Z$ can be specified for the steering ratio, the self-steering gradient, and the float angle gradient, which are supplied to processing unit 7 in signal form. From this information, processing unit 7 generates steering angle $\delta_1$, lengthwise speed $v_x$, basic values/target values $il_B$, $EG_B$, $SG_B/il_Z$, $EG_Z$ $SG_Z$ as well as additional vehicle-specific parameter 10, which likewise are supplied in signal form to processing unit 7, control signals that represent steady-state additional trail angles $\delta_{zv}^{s}$, $\delta_{zh}^{s}$ for the front and rear wheels.

For this purpose, first the transverse acceleration $a_y$ is determined in processing unit 7 in accordance with the relationship $$a_y = \delta_1/il_z * v_x^2/(v_x^2 * EG_z + 1r)$$

where $1r$ represents the wheelbase supplied to processing unit 7 in signal form as parameter 10. From the transverse acceleration $a_y$, the steady-state additional float angle $\beta^s$ is calculated by the equation $$\beta^s = a_y * (SB_B - SG_z).$$

From this, the steady-state additional trail angles $\delta_{zh}^{s}$, $\delta_{zv}^{s}$ at rear and front are calculated by the relationships $$\delta_{zh}^{s} = \beta^s,$$

$$\delta_{zv}^{s} = \beta^s + \delta_{zel}^{s}$$

with the steady-state additional self-steering angle $$\delta_{zel}^{s} = \delta_1/il_z * ((v_x^2 * EG_B + 1r)/(v_x^2 * EG_z + 1r)) - \delta_1/il_B$$

The steady-state additional trail angles $\delta_{zh}^{s}$, $\delta_{zv}^{s}$ at rear and front are supplied as control signals to positioning device 9 and are adjusted as described herein, during driving as a function of the current steering angle $\delta_1$ and the current speed $v_x$.

The basic values $il_B$, $EG_B$, and $SG_B$ for the steering ratio, the self-steering gradient, and the float angle gradient can be supplied either as input signals to control device 2 or stored in a storage unit in the control device, with the storage unit communicating with the processing unit 7.

In the second processing unit 8 connected downstream from the first processing unit 7, control signals representing the additional trail angles are rendered dynamic. For this purpose, in parameters nv, nkv which are initially internally in processing unit 8 (and are required to describe the dynamic behavior of the dynamic additional trail angle at the front $\delta_{zv}^{d}$), as well as parameters and nh, nkh (which are required for describing the dynamic behavior of the dynamic additional trail angle at the rear $\delta_{zh}^{d}$) are calculated.

The parameter nv is determined as a function of the lengthwise speed $v_x$ and the basic value $SG_B$ of the float angle gradient according to the equation:

$$nv = v_x * SG_B$$

To calculate the parameter nkv, a selectable transverse acceleration amplification factor df is supplied at the outset as the input signal to the processing unit 8, by which the curve of the frequency response of the transverse acceleration can be influenced in this way in the range between 0 and approximately 2 Hz. The amplification factor df can have values greater than zero, equal to zero, or less than zero.

If the amplification factor is equal to zero, the frequency response of the transverse acceleration remains uninfluenced. If the amplification factor is less than zero, the transverse acceleration amplification is reduced. If the amplification factor is greater than zero, the transverse acceleration amplification is increased.

The parameter nkv is calculated in a first advantageous embodiment according to the relationship $$nkv = v_x * (SG_B + df)$$

as a function of the lengthwise speed $v_x$, the basic value $SG_B$ of the float angle gradient, as well as the transverse acceleration amplification factor df, with fine tuning of the transverse acceleration frequency response in this embodiment taking place without compensation for the changes in the yaw rate frequency response.

In another advantageous embodiment, the parameter nkv the is determined according to the relationship $$nkv = v_x * (EG_B + SG_B + df)$$

additionally, as a function of the basic value $EG_B$ of the self-steering gradient. In this embodiment, changes in the frequency response of the yaw rate can be compensated.

The parameters nh, nkh can be calculated uniformly for both embodiments as follows:

$$nh = v_x * (EG_B + SG_B),$$

$$nkh = v_x * (EG_B + SG_B + df).$$

After the determination of the parameters nv, nkv, and nh, nkh, dynamic additional float angles at the front and rear $\beta_v^{d}$, $\beta_h^{d}$ are determined in processing unit 8 as a function of the steady-state additional float angle $\beta^s$ from the processing unit 7 as a differential equation in the Laplace form with the Laplace variable s:

$$\beta_v^{d} = (1 + nkv*s)/(1 + nv*s) * \beta^s$$

$$\beta_h^{d} = (1 + nkh*s)/(1 + nh*s) * \beta^s$$

The additional trail angles $\delta_{zv}^{d}$, $\delta_{zh}^{d}$ that have been rendered dynamic at the front and rear are determined by the relationships $$\delta_{zv}^{d} = \beta_v^{d} + \delta_{zel}^{d}$$

$$\delta_{zh}^{d} = \beta_h^{d}$$

where $\delta_{zel}^{d}$ is called a dynamic additional self-steering angle which is calculated as a function of the steering angle $\delta_1$ and the basic value ils of the steering ratio as follows:

$$\delta_{zel}{}^d = \delta_{Sub} - \delta_1/il_B$$

using the substitution variable $\delta_{Sub}$, which can be represented as a differential equation in the Laplace transform:

$$\delta_{Sub} = \frac{(s^2/\omega_{0B}^2 + 2*D_B/\omega_{0B}*s + 1)}{(s^2/\omega_{0Z}^2 + 2*D_Z/\omega_{0Z}*s + 1)} * (\delta_1/il_B + \delta_{zel}^s)$$

The substitution variable $\delta_{Sub}$ depends on the steering angle $\delta_1$, the basic value $il_B$ of the steering ratio, the steady-state additional self-steering angle $\delta_{zel}$ known from the first processing unit 7, and also from the basic values $\omega_{0B}$, $D_B$ for the yaw natural frequency and yaw damping which correspond to the basic tuning of the vehicle, and target values $\omega_{0Z}$, $D_Z$ to be specified for the yaw natural frequency and yaw damping. The target values $\omega_{0Z}$ for the yaw natural frequency and the yaw damping can be supplied as parameters 11 as input signals to the second processing unit 8. The basic values $\omega_{0B}$, $D_B$ for the undamped yaw natural frequency and yaw damping are determined from the relationships $$\omega_{0B} = a + b/v_x^2,$$

$$D = c/(v_x * \omega_{0B})$$

where a, b, and c are parameters that can be determined from measurement curves of the yaw natural frequency for two speeds, at 80 km/h and 120 km/h for example.

In the steady-state case, in other words for s=0, the relationships for the additional trail angles $\delta_{zv}{}^d$, $\delta_{zh}{}^d$ that have been rendered dynamic are identical with the relationships for the steady-state additional trail angles $\delta_{zv}{}^s$, $\delta_{zh}{}^s$.

The transverse dynamics can be adjusted using software with the control device according to the invention. This reduces the need for adapting mechanical elements to a desired dynamics of vehicle behavior.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control device for adjusting driving dynamics of a four wheel vehicle, comprising:
   inputs for receiving first and second signals indicative of vehicle longitudinal speed $v_x$ and steering angle $\delta$, respectively;
   means coupled to receive said first and second signals, for generating control signals for controlling vehicle wheels of said vehicle; and
   positioning devices for controlling said vehicle wheels in response to said control signals; wherein
   said control device has additional inputs for receiving selectable target values for a steering ratio $il_z$, a self steering gradient $_{Egz}$ and a float angle gradient $SG_z$ as set signals for setting a desired driving behavior;
   transverse acceleration of the vehicle corresponds to the relationship $$a_y = \delta_1/il_z * v_x^2/(v_x^2 * _{Egz} + 1r),$$

where $1r$ represents a wheelbase of the vehicle;
   a steady-state additional float angle $\beta^s$ corresponds to the relationship $$\beta^s = a_y * (SG_B - SG_z)$$

rear and front steady-state trail angles $\delta_{zh}{}^s$, $\delta_{zv}{}^s$ correspond to the relationship $$\delta_{zh}{}^s = \beta^s$$

$$\delta_{zv}{}^s = \beta^s + \delta_{zel}{}^s$$

with the steady-state additional self-steering angle $$\delta_{zel}{}^s = \delta_1/il_z * ((v_x^2 * EG_B + 1r)/(v_x^2 * _{EGz} + 1r)) - \delta_1/il_B$$

where $il_B$ is a known basic value of the steering ratio, $EG_B$ is a known basic value of the self-steering gradient, and the control signals that can be supplied to the positioning devices represent steady-state additional rear and front trail angles $\delta_{zh}{}^d$, $\delta_{zv}{}^d$.

2. Control device according to claim 1, wherein control signals can be generated to control a desired dynamic driving behavior, said signals representing an additional trail angle $\delta_{zh}{}^d$, $\delta_{zv}{}^d$ at the rear and front that has been rendered dynamic.

3. Control device according to claim 2, wherein the additional trail angles $\delta_{zh}{}^d$, $\delta_{zv}{}^d$ at the rear and front that have been rendered dynamic correspond to the relationships $$\delta_{zh}{}^d = \beta_h{}^d$$

$$\delta_{zv}{}^d = \beta_v{}^d + \delta_{zel}{}^d$$

where $\beta_h{}^d$ represents the dynamic additional float angle at the rear, $\beta_v{}^d$ represents the dynamic additional float angle at the front, and $\delta_{zel}{}^d$ represents the dynamic additional self-steering angle.

4. Control device according to claim 3 wherein the dynamic float angle at the rear $\beta_h{}^d$ can be determined according to the Laplace transform $$\beta_h{}^d = (1 + nkh*s)/(1 + nh*\beta^s)$$

as a function of the steady-state additional float angle $\beta^s$, where s is the Laplace variable, and nkh, nh are parameters that depend on the lengthwise velocity $v_x$.

5. Control device according to claim 3 wherein the dynamic additional front float angle $\beta_v{}^d$ as a function of the steady-state additional float angle $\beta^s$ corresponds to the Laplace transform $$\beta_v{}^d = (1 + nkv*s)/(1 + nv*s) * \beta^{2s}$$

where nkv and nv are the parameters that depend on the longitudinal speed $v_x$.

6. Control device according to claim 4 wherein the parameter nh can be determined by the relationship $$nh = v_x * (EG_B + SG_B)$$

as a function of the basic values $EG_B$, $SG_B$ of the self-steering gradient and the float angle gradient.

7. Control device according to claim 5 wherein the parameter nkv can be determined from the relationship $$nkv = v_x * (SG_B + df)$$

as a function of presettable basic value $SG_B$ of the float angle and the transverse acceleration amplification factor df.

8. Control device according to claim 7 wherein the parameter nkv the can be determined from the relationship $$nkv = v_x * (EG_B + SG_B + df)$$

as a function of presettable basic values $EG_B$, $SG_B$ of the self-steering gradient and the float angle gradient, and of the transverse acceleration amplification factor (df).

9. Control device according to claim 5 wherein the parameter nv can be determined from the relationship $$nv = v_x * SG_B$$

as a function of the basic value $SG_B$ of the float angle gradient.

10. Control device according to claim 3 wherein the dynamic additional self-steering angle $\delta_{zel}^d$ corresponds to the relationship $$\delta_{zel}^d = \delta_{Sub} - \delta_l/il_B$$

using a substitution variable $\delta_{Sub}$ which follows the Laplace transform $$\delta_{Sub} = \frac{(s^2/\omega_{0B}^2 + 2*D_B/\omega_{0B}*s + 1)}{(s^2/\omega_{0Z}^2 + 2*D_Z/\omega_{0Z}*s + 1)} * (\delta_1/il_B + \delta_{zel}^s)$$

as a function of the steady-state additional self-steering angle $\delta_{zel}^d$, where $\omega_{0B}$ is a known basic value for the yaw natural frequency, $D_B$ is a known basic value for the yaw damping, $\omega_{0Z}$ is a target value to be set for the yaw natural frequency, and $D_Z$ is a target value to be set for the yaw damping.

11. Control device according to claim 10 wherein the basic values ($\omega 0B$, $D_B$) for the yaw natural frequency and the yaw damping can be determined from the relationships $$\omega_{0B} = a + b/v_x^2$$

$$D = c/(v_x * \omega_{0B})$$

where a, b, and c are parameters that can be determined from measurement curves of the yaw natural frequency.

12. Control device according to claim 4 wherein the parameter nkh can be determined according to the relationship $$nkh = v_x * (EG_B + SG_B + df)$$

as a function of the basic values $EG_B$, $SG_B$ of the self-steering gradient and the float angle gradient and a presettable transverse acceleration amplification factor df.

13. Control device according to claim 12 wherein the transverse acceleration amplification factor df for lowering the transverse acceleration amplification is less than zero.

14. Control device according to claim 12 wherein the transverse acceleration amplification factor df for avoiding a critical drop in transverse acceleration amplification is larger than zero.

* * * * *